(12) United States Patent
Cullen et al.

(10) Patent No.: US 6,397,213 B1
(45) Date of Patent: May 28, 2002

(54) SEARCH AND RETRIEVAL USING DOCUMENT DECOMPOSITION

(75) Inventors: John F. Cullen, Mountain View; Jonathan J. Hull, San Carlos, both of CA (US)

(73) Assignee: Ricoh Company Ltd. (JP)

( * ) Notice: Subject to any disclaimer, the term of this patent is extended or adjusted under 35 U.S.C. 154(b) by 0 days.

(21) Appl. No.: 09/311,200

(22) Filed: May 12, 1999

(51) Int. Cl.$^7$ .......................... G06F 17/30; G06F 17/00
(52) U.S. Cl. ........................................................ 707/5
(58) Field of Search ................. 707/1–6, 104; 382/176

(56) References Cited

U.S. PATENT DOCUMENTS

| | | | | |
|---|---|---|---|---|
| 5,197,107 A | * | 3/1993 | Katsuyama et al. | 382/30 |
| 5,404,435 A | * | 4/1995 | Rosenbaum | 395/147 |
| 5,465,353 A | * | 11/1995 | Hull et al. | 395/600 |
| 5,598,557 A | * | 1/1997 | Donner et al. | 395/605 |
| 6,002,798 A | * | 12/1999 | Palmer et al. | 382/176 |

* cited by examiner

*Primary Examiner*—John Breene
*Assistant Examiner*—Susan F. Rayyan
(74) *Attorney, Agent, or Firm*—Townsend and Townsend and Crew LLP; Steven J. Cahill

(57) ABSTRACT

Document query and search techniques in which documents to be searched are "decomposed" into "zones," with each zone representing a grouping of text or graphical image or a combination thereof. The zones are defined within, and associated with a document page. One or more zones in the documents are selected for annotation with text (e.g., keywords), image features, or a combination of both. Document query and search are based on a combination of text annotations and image features. In one implementation for operating a document retrieval system, an unindexed (also referred to as a "query" or "search key") document is captured into electronic form and decomposed into a number of zones. The zones can be segmented into text zones and image zones. Descriptors are formed for at least one of the zones. The descriptors can include text annotations for text zones, and text annotations and image features for image zones. Documents in a document database are searched, based on the formed descriptors for the unindexed document and the descriptors for the documents in the database. At least one document in the database is identifying as matching the unindexed document and reported as such.

27 Claims, 15 Drawing Sheets

| Numbered Element | Text Label |
|---|---|
| 540a - 540g | Text Annotation |
| 322a, 322f, 322i | Text Zones |
| 326a, 326c | Image Zones |
| 324a, 324c | Heading Text Zones |

| | | | | | |
|---|---|---|---|---|---|
| 207 261 Column | 758 303 to | 621 389 point" | 360 472 buttons | 850 516 of | |
| 381 261 of | 796 303 different | 735 389 densities | 477 472 called | 890 516 the | |
| 364 261 buttons | 930 303 classes | 892 389 over | 577 472 GRAPHICS | 940 516 search | |
| 486 261 titled | 207 345 of | 977 389 the | 764 472 allows | 208 558 document. | |
| 580 261 TEXTURE | 237 345 documents | 207 430 documents | 870 472 the | 360 558 The | |
| 754 261 allows | 395 345 that | 359 430 are | 962 472 user | 429 558 third | |
| 862 261 the | 458 345 were | 412 430 used | 1000 472 to | 512 558 column | |
| 921 261 user | 534 345 considered | 489 430 to | 208 516 select | 633 558 of | |
| 997 261 to | 696 345 in | 525 430 determine | 286 516 the | 677 558 buttons | |
| 208 303 specify | 731 345 this | 677 430 texture | 337 516 composition | 794 558 called | |
| 308 303 the | 790 345 work. | 789 430 values. | 520 516 of | 895 558 LAYOUT | |
| 362 303 document | 878 345 Connected | 893 430 A | 560 516 title | 208 600 allows | |
| 514 303 type. | 207 389 components | 930 430 second | 622 516 text | 296 600 the | |
| 592 303 This | 397 389 and | 207 472 column | 684 516 and | 349 600 user | |
| 666 303 refers | 468 389 "interest | 315 472 of | 743 516 picture | 417 600 select | |
| | | | | 506 600 the | |

FIG. 4B

| | | | | |
|---|---|---|---|---|
| 530 2558 document 19 | 1868 1214 interest 9 | 1620 506 size 5 | 798 507 texture 4 | 280 2814 features 4 |
| 673 959 document 19 | 1322 356 interest 9 | 1389 308 size 5 | 1480 608 texture 4 | 553 2606 features 4 |
| 1323 2957 document 19 | 2060 1465 interest 9 | 442 2459 size 5 | 1322 657 texture 4 | 982 2966 distribution 4 |
| 337 2658 document 19 | 1556 809 interest 9 | 1630 408 size 5 | 738 2966 text 4 | 1936 1416 distribution 4 |
| 1739 308 document 19 | 1323 857 interest 9 | 616 2966 size 5 | 1053 708 text 4 | 1792 356 distribution 4 |
| 426 357 document 19 | 2002 657 interest 9 | 978 2606 query 5 | 1320 308 text 4 | 1677 459 distribution 4 |
| 1927 506 document 19 | 1410 1465 interest 9 | 940 2157 query 5 | 733 609 text 4 | 244 459 components 4 |
| 246 2357 document 19 | 1092 557 user 8 | 439 1107 query 5 | 1468 857 points 4 | 1320 459 components 4 |
| 764 2157 document 19 | 1142 1057 user 8 | 1101 2307 query 5 | 1540 1465 points 4 | 1561 758 components 4 |
| 2040 608 document 19 | 515 2357 user 8 | 741 908 query 5 | 2159 657 points 4 | 1733 2007 components 4 |
| 829 2916 document 19 | 608 2307 user 8 | 1322 1857 elements 5 | 1473 356 points 4 | 989 2357 type 3 |
| 409 908 document 19 | 451 807 user 8 | 1652 1957 elements 5 | 245 1107 generates 4 | 606 357 type 3 |
| 245 857 document 19 | 681 2108 user 8 | 1322 1757 elements 5 | 535 807 generates 4 | 1093 807 type 3 |
| 245 759 document 19 | 411 708 user 8 | 1775 557 elements 5 | 1030 857 generates 4 | 246 1008 system 3 |
| 1861 1809 document 19 | 1086 308 user 8 | 2049 758 elements 5 | 994 2558 generates 4 | 824 857 system 3 |
| 245 659 document 19 | 244 507 documents 6 | 1035 407 connected 5 | 1907 857 figure 4 | 935 1057 system 3 |
| 2112 1908 document 19 | 1705 2507 documents 6 | 1554 2007 connected 5 | 363 2108 figure 4 | 1546 1618 point 3 |
| 1535 2057 document 19 | 2040 2409 documents 6 | 2092 408 connected 5 | 1041 1107 figure 4 | 732 459 point 3 |
| 2097 2109 document 19 | 1387 2049 documents 6 | 2106 1757 connected 5 | 1405 1416 figure 4 | 1692 809 point 3 |
| 1543 1230 interest 9 | 279 407 documents 6 | 1358 758 connected 5 | 1605 608 figure 4 | 1549 1757 obtained 3 |
| 551 459 interest 9 | 1323 2607 documents 6 | 684 308 texture 4 | 1437 657 figure 4 | 1883 1957 obtained 3 |

FIG. 4C

SEARCH AND RETRIEVAL USING DOCUMENT DECOMPOSITION

BACKGROUND OF THE INVENTION

The present invention relates to a document management system, and more particularly to a method and apparatus for assisting a user with the tasks of querying and retrieving documents.

With advances in electronic media, documents are becoming widely available in electronic form. Some documents are available electronically by virtue of their creation using software applications. Other electronic documents are available via electronic mails, the Internet, and various other electronic media. Yet others become available in electronic form by virtue of being scanned-in, copied, or faxed.

Today's computing systems are becoming economical tools for organizing and manipulating these electronic documents. With the rapid development of storage system technology, the cost of storing an image of a page of a document on digital media has greatly decreased, perhaps becoming more economical than the cost of printing and storing the image on a sheet of paper. Digital document storage also provides additional advantages, such as facilitating later electronic searches and retrieval and making possible the automatic filing of documents.

For an efficient and useful digital storage system, the user must be able to query for, and retrieve documents quickly and efficiently. In fact, the utility of many storage systems often depends on the effectiveness of the query and search mechanisms. This, in turn, depends largely on the techniques used to define, describe, and catalog documents. Naturally, these tasks become more complicated as the type of documents varies and the number of documents increases.

Many conventional digital storage systems allow for text-based searching of documents though the use of keyword extraction. Although various variants of this technique exist, the user generally defines a list of keywords and the system searches for and retrieves documents containing these keywords. The search is typically performed over whole documents, without distinguishing between sections of documents. Different weighting functions are used to improve the likelihood of success in retrieval of the desired documents.

Most conventional digital storage systems, including those that purely use keyword extraction, do not provide mechanisms to define and catalog documents using images (or pictures) contained in the documents. The images can include anything that is not recognized as text, such as graphics, applications, executable code, sounds, movies, and so forth. Many conventional systems process the text in the documents and ignore the picture information. However, many documents contain both text and images, and it is beneficial to make use of the image information for improved query and search performance. The benefits become greater as the use of images becomes more prevalent and the number of documents having images increases.

As can be seen, a document management system that utilizes images in documents to enhance the effectiveness of the query and retrieval process is highly desirable.

SUMMARY OF THE INVENTION

The invention provides powerful document query and search techniques. The documents to be searched are "decomposed" into "zones," with each zone representing a grouping of text or graphical image (also referred to herein as a "picture") or a combination thereof. The zones are generally defined within, and associated with a particular document page. One or more of the zones in the documents are selected for annotation with text (e.g., keywords), image features, or a combination of both. Document query and search are based on a combination of text annotations and image features. The invention can be used to search for text and images. As a simple example, the user can enter a text query, such as "sunset", and the system can return images of sunsets because they occur in documents (in the database) that contain the word "sunset" in close physical proximity to the image.

A specific embodiment of the invention provides a method for operating a document retrieval system. In this method, an unindexed (also referred to as a "query" or "search key") document is captured into electronic form. The unindexed document is then decomposed into a number of zones, with each zone including text or image or a combination thereof. The zones can be segmented into text zones and image zones. Descriptors are formed for at least one of the zones. The descriptors can include text annotations for text zones, and text annotations and image features for image zones. Documents in a document database are searched, based on the formed descriptors for the unindexed document and the descriptors for the documents in the database. At least one document in the database is identified as matching the unindexed document and reported as such.

Another specific embodiment of the invention provides a method for generating search keys for querying a document database. In this method, a query (or search key) document is formed, and a number of zones is defined for that document. Each zone is associated with text or image or a combination thereof. Descriptors for at least one of the zones are formed. Each descriptor is associated with a particular zone and includes search key information. The descriptors are used as search keys for querying the document database.

Yet another specific embodiment of the invention provides a document management system that includes an electronic storage system and a control system. The electronic storage system is configured to store a database of documents and descriptors for documents in the database. The control system couples to the electronic storage system. The control system is configured to: (1) generate descriptors for at least one zone of an unindexed document, (2) search documents in the database using the generated descriptors for the unindexed document image and the descriptors for documents in the database, (3) identify at least one document as matching the unindexed document, and (4) display the identified document.

The invention also provides software products that implement the methods described herein.

The foregoing, together with other aspects of this invention, will become more apparent when referring to the following specification, claims, and accompanying drawings.

BRIEF DESCRIPTION OF THE DRAWINGS

FIGS. 4B and 4C show partial listings of the scanned words and the filtered and sorted words, respectively, for the document shown in FIG. 3;

DESCRIPTION OF THE SPECIFIC EMBODIMENTS

Figure 1:
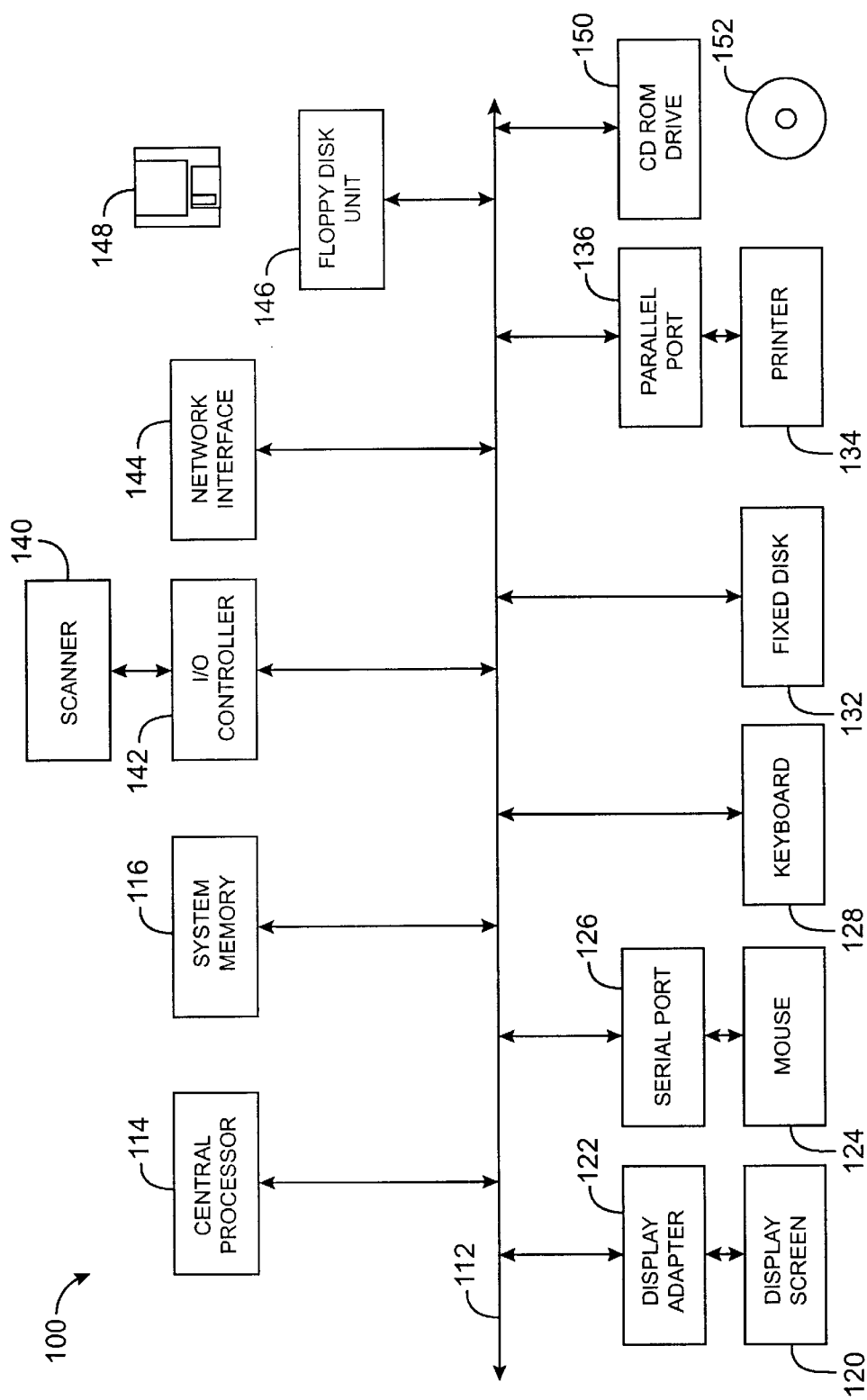
FIG. 1 shows the basic subsystems of a computer system suitable for use with the present invention.

FIG. 1 shows the basic subsystems of a computer system 100 suitable for use with the present invention. In FIG. 1, computer system 100 includes a bus 112 that interconnects major subsystems such as a central processor 114 and a system memory 116. Bus 112 further interconnects other devices such as a display screen 120 via a display adapter 122, a mouse 124 via a serial port 126, a keyboard 128, a fixed disk drive 132, a printer 134 via a parallel port 136, a scanner 140 via an input/output (I/O) controller 142, a network interface card 144, a floppy disk drive 146 operative to receive a floppy disk 148, and a CD-ROM drive 150 operative to receive a CD-ROM 152. Source code to implement some embodiments of the invention may be operatively disposed in system memory 116 or stored on storage media such as fixed disk drive 132, floppy disk 148, or CD-ROM 152.

Many other devices or subsystems (not shown) can be coupled, such as a touch screen, a trackball, and others. Also, it is not necessary for all of the devices shown in FIG. 1 to be present to practice the invention. Moreover, the devices and subsystems may be interconnected in different ways than that shown in FIG. 1. The operation of a computer system such as that shown in FIG. 1 is readily known in the art and not described in detail herein.

Figure 2A:
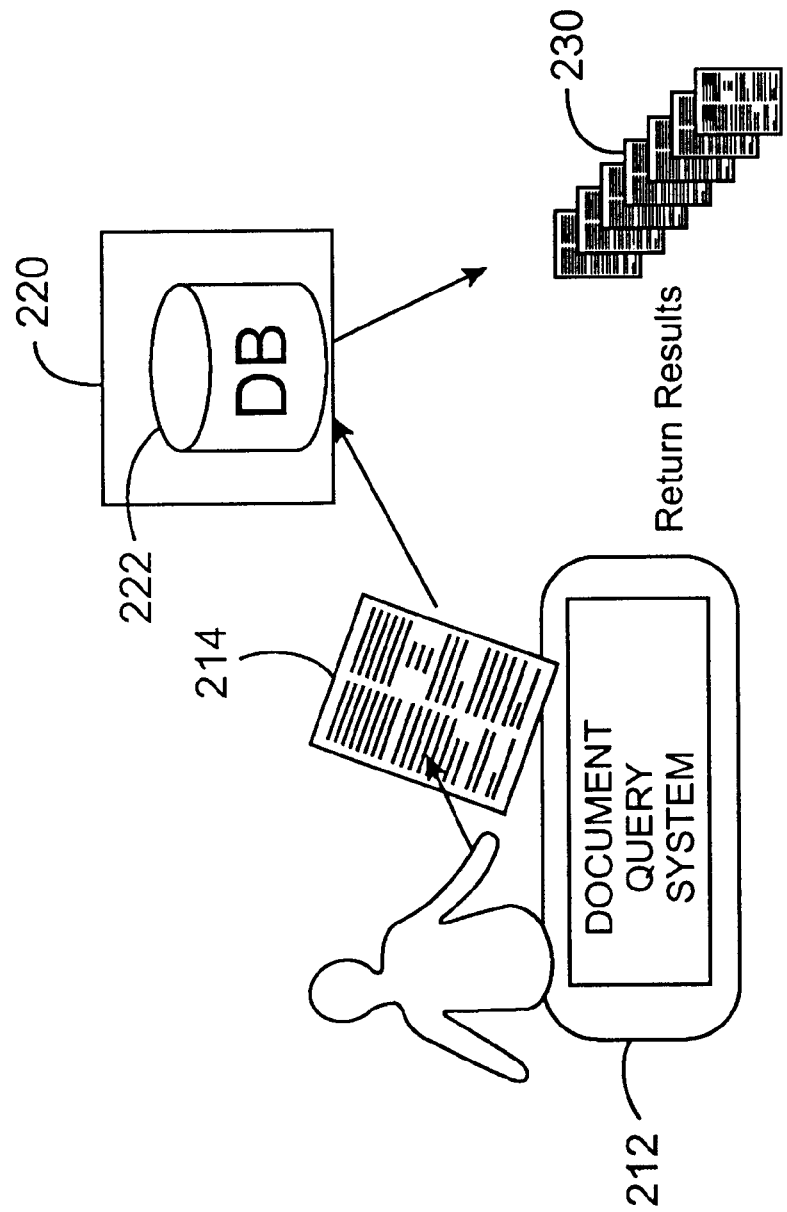
FIGS. 2A and 2B show a graphical diagram and a flow diagram, respectively, of an embodiment of a document retrieval process.
Figure 2B:
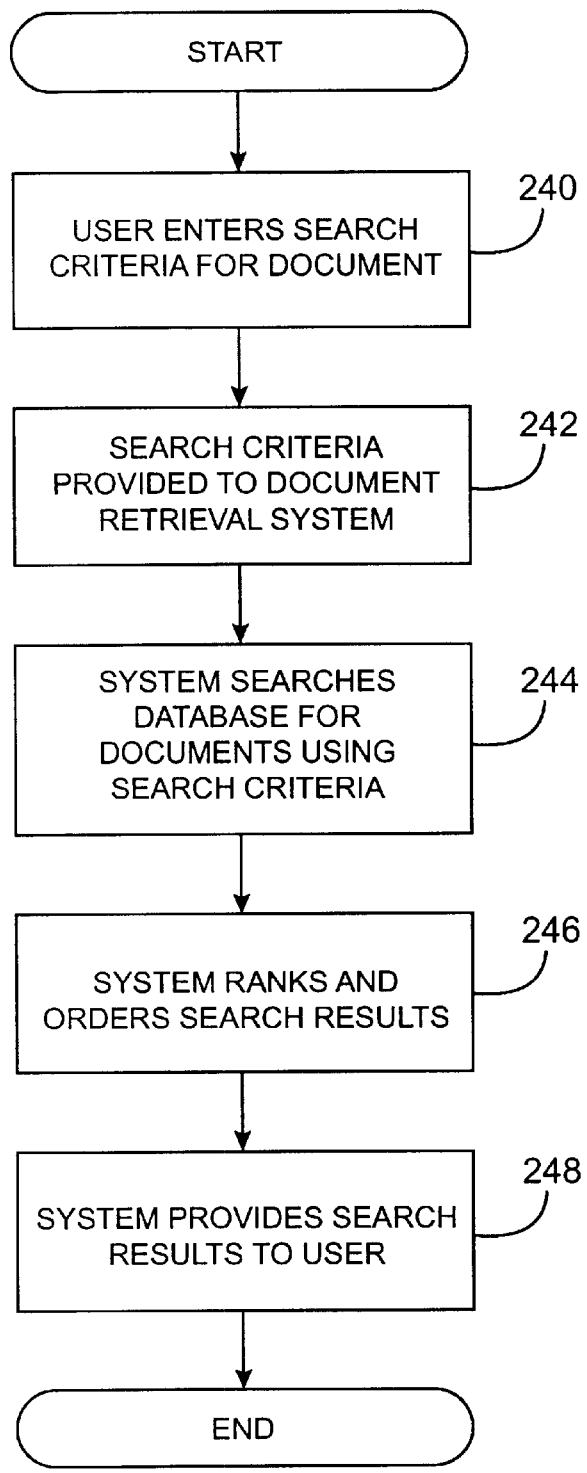

FIGS. 2A and 2B show a graphical diagram and a flow diagram, respectively, of an embodiment of a document retrieval process. A user operates a document query system 212 and enters search criteria for a document, at step 240. The criteria can be entered by allowing the user, via a user interface, to define features of the document to be searched, or by allowing the user to select a sample document and edit the features to be searched. A query document 214 containing the search criteria is then provided to a document retrieval system 220 that manages a database 222 of documents, at step 242. System 220 searches database 222 for documents that match the search criteria, at step 244, ranks and orders the search results 230, at step 246, and provides the search results to the user, at step 248. Additional processing can be performed based on the search results and additional user inputs.

In accordance with an aspect of the invention, each document to be searched is "decomposed" into "zones." Each zone represents a grouping of text or a graphical image (also referred to herein as a "picture"). A zone can also include a combination of text and graphical image, such in the case of a picture and its caption or heading. Zones are typically isolated from each another by regions of (empty) space. Generally, zones are defined within, and associated with a particular document page. Other definitions of zones can be contemplated and are within the scope of the invention.

Figure 3:
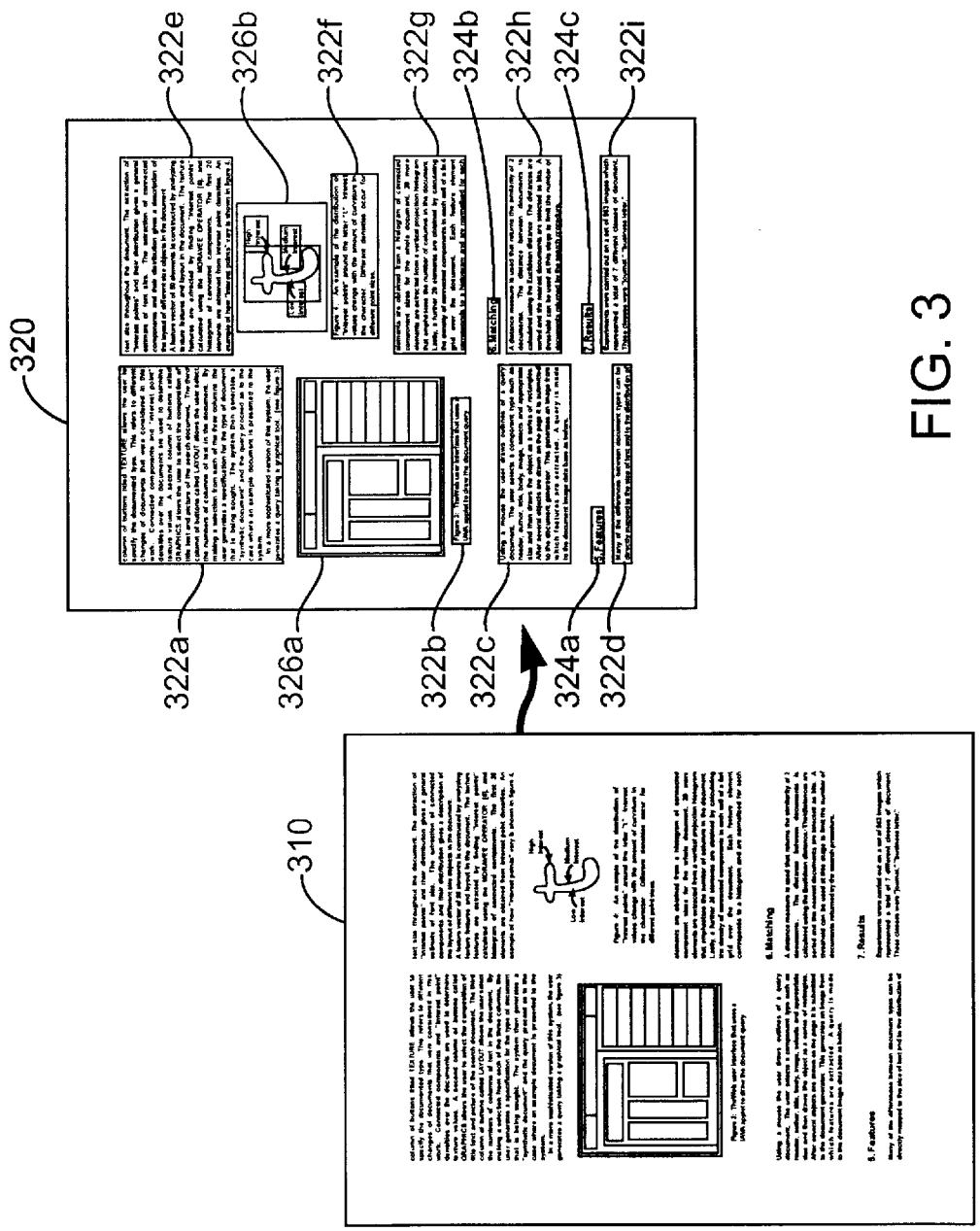
FIG. 3 shows a diagram of a document and its decomposition into zones.

FIG. 3 shows a diagram of a document 310 and its decomposition into zones. Document 310 contains a combination of text and graphical images. Document 310 can be a document that is generated electronically or a document that has been transformed into an electronic form (i.e., by scanning in the document). The determination of the zones can be performed with the aid of an optical character recognition (OCR) software application that is widely available in the art. One such OCR application is OMNIPAGE from CAERE Corporation. For example, the zones can be defined based on blank or extraneous characters, or both, generated by the OCR application.

As shown in FIG. 3, a document 320 is a representation of document 310 with the text and graphical images decomposed into zones. Text zones 322a through 322i represent areas of document 310 that include body text. Text zones 324a through 324c represent areas of document 310 that include heading text. Image zones 326a and 326b represent areas of document 310 that include graphical images and possibly some text (i.e., depending on the ability of the OCR application to recognize characters in close proximity with the graphical image). An image zone, such as image zone 326b, can be further decomposed into additional zones, again depending on the recognition ability of the OCR application and the particular criteria used to define the zones. As shown in FIG. 3, text zone 322b contains the caption for the image in zone 326a, and is decomposed into a text zone separate from its corresponding image. In some implementations, the caption can be grouped with its corresponding image.

In the invention, techniques are provided to characterize documents to assist in their query and retrieval. An aspect of the invention provides techniques for decomposing a document into zones and segmenting the zones into text and image zones. Another aspect of the invention provides techniques for annotating the text and image zones. As use herein and as described below, annotating is the process of assigning characteristic information such as text or image features, or both, to a particular zone.

Figure 4A:
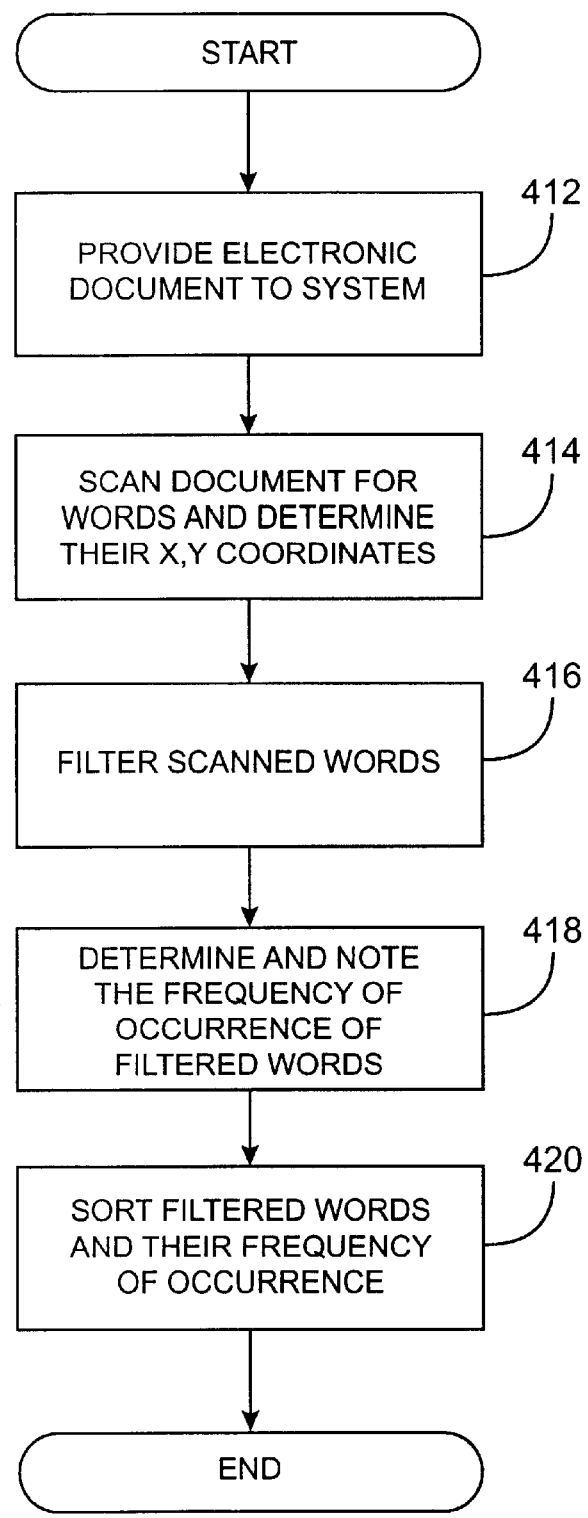
FIG. 4A and shows a flow diagram of an embodiment of a keyword extraction process.

FIG. 4A shows a flow diagram of an embodiment of a keyword extraction process. The extracted keywords are used in the annotation of text and image zones, as described below. At step 412, an electronic document is provided to the system. The electronic document can be a document created electronically or a document transformed into electronic form (i.e., scanned in with a scanner, a facsimile machine, or a copying machine). The document is (electronically) scanned for words (i.e., text) and the locations of recognized words are determined, at step 414. Word recognition and extraction can be performed, for example, by the OCR application during the scan-in process. The word location can be represented by x, y coordinates that correspond to, for example, the point at the baseline of the word at the start of the word. However, the x, y coordinates can also correspond to other locations of a word (e.g., the centroid of the word). The recognized words are placed on a list.

Once the document has been (electronically) scanned for words, filters are used to remove undesirable words and characters, at step 416. In an embodiment, "stop" words and extraneous characters are filtered (removed) by a word and character filter. A list of stop words to be filtered can include, for example, 524 common stop words such as (a, able, about, above, according, anything, anyway, anyways, anywhere, and so on). The extraneous characters to be filtered can include, for example, (",.~@$#!&*), which are typically generated due to mis-recognition by the OCR application. The frequency of occurrence of the filtered words is then determined, and this frequency is noted with the word, at step 418. For ease of processing, the filtered words are sorted according to their frequency of occurrence, at step 420.

FIG. 4B shows a partial listing of the scanned words for document 310 in FIG. 3. The x, y coordinate of each word is shown preceding the word. In an embodiment, the x, y coordinate corresponds to the baseline at the start of the word.

FIG. 4C shows a partial listing of the filtered and sorted words for document 310 in FIG. 3. The x, y coordinate of each word is shown preceding the word and the frequency of occurrence of that word in the document is shown following the word. The words are sorted with the most frequently occurring words appearing first (i.e., in the left column) in the list.

In accordance with an aspect of the invention, to improve the performance of the query and search process, text and image zones in the document are assigned annotations (or descriptors). An annotation is a set of words and other information that describes a particular text or image zone.

In an embodiment, a text annotation is assigned to each of the zones in the document. The text annotation for a particular zone includes a list of words found inside the zone (if any) and outside the zone within the same document page. For example, the text annotation assigned to an image zone includes texts from adjacent zones in addition to the picture caption, and the text annotation assigned to a text zone includes text from outside the text zone. By using text from adjacent zones, a useful list of keywords can be generated even for zones that include no words (e.g., image zones) or few words (e.g., an "Introduction" heading). Thus, for a document page that includes both text and one or more images, words are selected from the text and assigned to the image.

The assignment of a text annotation to each of the zones in the document can provide enhanced searching accuracy, but typically requires additional storage. In an embodiment, a text annotation is assigned to a selected number of zones in the document. The zones can be selected based on, for example, the size of the zone. Alternatively or additionally, the zones can be selected based on, for example, the word list developed for the text zones or the image features extracted for the image zones, or both.

In an embodiment, a text annotation for a particular zone includes a list of words that are weighted based on a predetermined weighting scheme. In an embodiment, the words are weighted based on, for example, their distance from the centroid of the particular zone and their frequency of occurrence. The use of distance in the text annotation gives greater importance to words closer to the zone. A basic formula that computes the weights based on the distance of the words from the centroid of the zone, the frequency of the word, and the size of the zone is as follows:

$$weight(word) = (\alpha \cdot freq(word)) \frac{area(zone)}{dist(word, centroid)}, \quad \text{Eq (1)}$$

where $\alpha$ is a heuristically defined weighting factor. Other weighting formula can be generated and are within the scope of the invention. Further, different weighting formulas can be used for different types of documents. As an example, words within the zone being annotated can be given more weight than words outside the zone. Also, the length of the word can be taken into account to give higher weights to longer words. Moreover, it may be determined that improved performance can be obtained if the URLs on a web page are given more weights than other words on the web page.

Figure 5A:
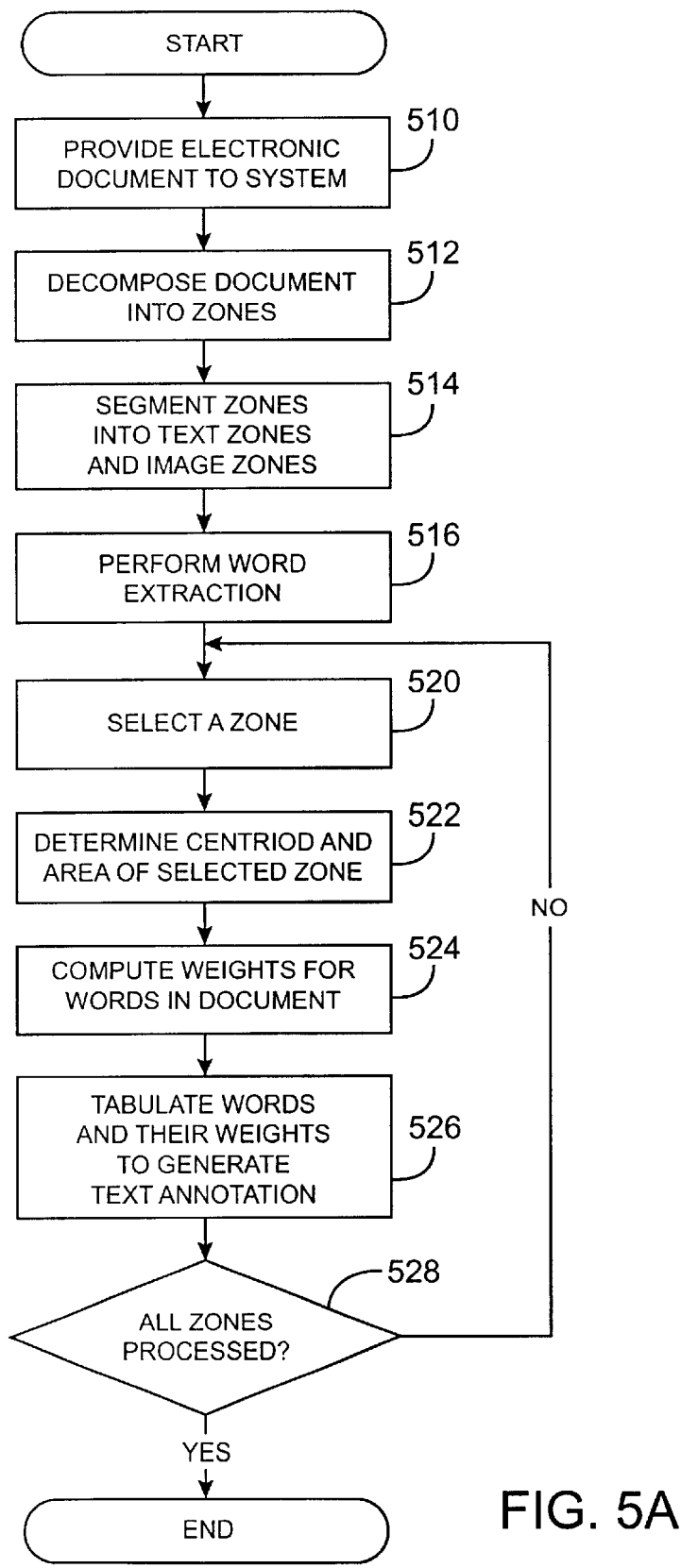
FIG. 5A shows a flow diagram of an embodiment of a text annotation process.

FIG. 5A shows a flow diagram of an embodiment of a text annotation process. At step 510, an electronic document is provided to the system, in a similar manner as for step 410 in FIG. 4A. The electronic document is decomposed into zones, at step 512, and the zones are segmented to text zones and image zones, at step 514. The decomposition and segmentation of zones can be achieved, for example, with the assistance of the OCR application. Word extraction is then performed on the document, at step 516, in accordance with the process shown in FIG. 4A to generate a list of words, their coordinates, and their frequency of occurrence.

Text annotation of a zone commences at step 520 where a zone is selected. The centroid and area of the selected zone is then determined, at step 522. Using a weighting formula such as equation (1) and the list of filtered and sorted words generated in step 516 (as shown in FIG. 4C), the weights for words in the document are determined, at step 524. The weights are processed and tabulated, at step 526. For example, the weights can be sorted and words having weights below a predetermined threshold can be eliminated. The tabulated words and their weights form the text annotation for this zone. At step 528, a determination is made whether all zones in the document selected for annotation have, in fact, been annotated. If annotations have not been assigned for all selected zones, the process returns to step 520 and another zone is selected for processing. Otherwise, the annotation process terminates.

Figure 5B:
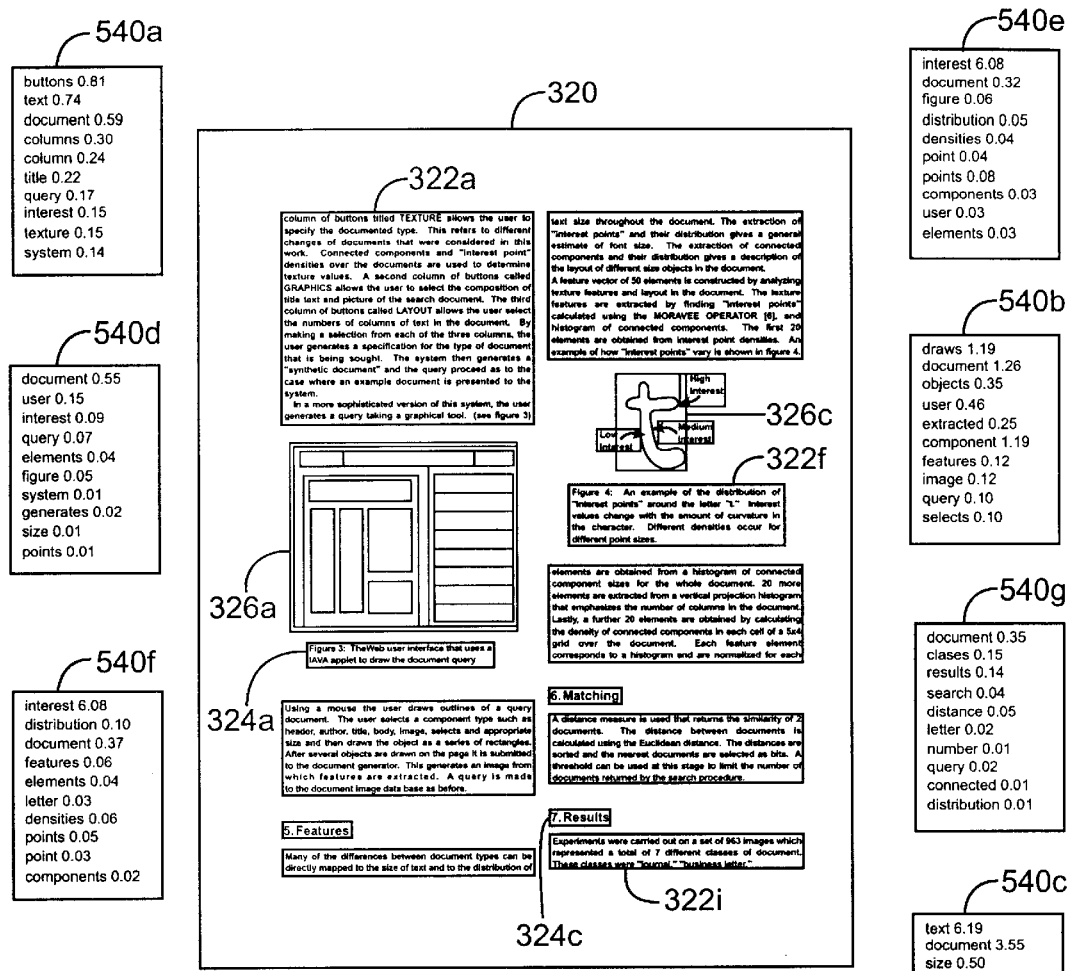
FIG. 5B shows a diagram of the text annotations for some of the zones of the decomposed document.

FIG. 5B shows a diagram of the text annotations for some of the zones of decomposed document 320. Text annotations 540a through 540c correspond to text zones 322a, 322f, and 322i, respectively. Text annotations 540d and 540e correspond to image zones 326a and 326c, respectively. And text annotations 540f and 540g correspond to heading text zones 324a and 324c, respectively.

As shown in FIG. 5B, each text annotation includes a list of words and their computed weights. By including words from outside the zone in the text annotation, even zones containing images (e.g., image zones 326a and 326c) or small amounts of text (e.g., text zones 324a and 324c) can be associated with a detailed text annotation that includes text from neighboring areas.

To enhance the document query and search process, image features are extracted from image zones and are stored, for example, as a normalized vector suitable for image matching. The combination of the text annotation and image features provides several advantageous ways of retrieving documents from a database.

Figure 6A:
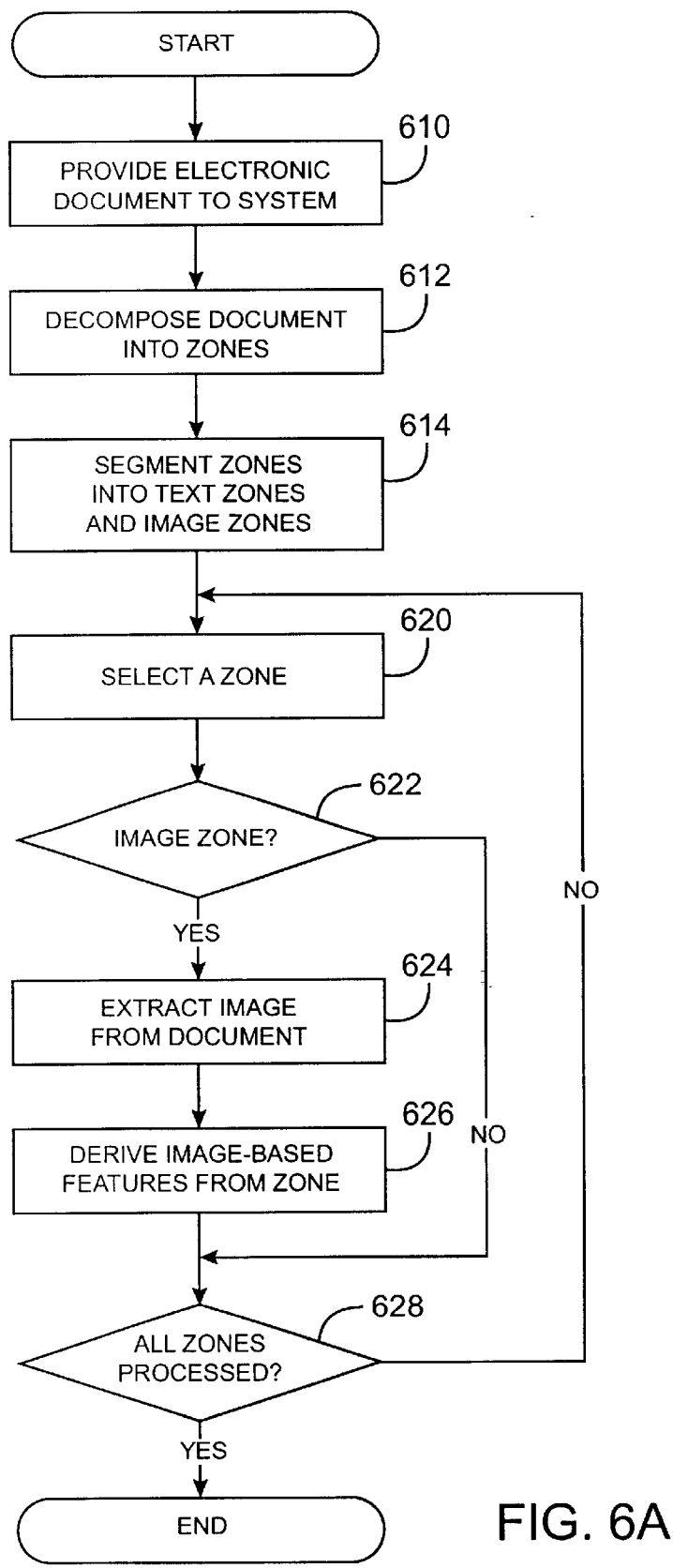
FIG. 6A shows a flow diagram of an embodiment of an image feature extraction process.

FIG. 6A shows a flow diagram of an embodiment of an image feature extraction process. An electronic document is provided to the system, at step 610. The document is decomposed into zones, at step 612, and the zones are segmented, at step 614. Steps 610, 612, and 614 are performed during the text annotation process shown in FIG. 5A.

Image feature extraction for a zone commences at step 620 where a zone is selected. A determination is then made whether the selected zone is an image zone, at step 622. This determination can be based on the generation of a (relatively large) set of extraneous characters from the OCR. Alternatively, some commercial OCR packages, such as Scanwork from Xerox Corporation, can output the x,y coordinates of zones and indications of whether they contain an image or text. If it is determined that the selected zone is not an image zone, the process proceeds to step 628. Otherwise, if the selected zone is an image zone, the image is extracted from the document, at step 624, and image-based features are derived from areas of the extracted image, at step 626. In an embodiment, a method employing interest point densities is used to extract salient image features. This method is described in detail in U.S. patent application Ser. No. 08/527,826, entitled "Simultaneous Registration of Multiple Image Fragments," filed Sep. 13, 1995, now allowed, assigned to the assignee of the present invention, and incorporated herein by reference. The image-based features are saved for this image zone.

At step 628, a determination is made whether all zones in the document selected for feature extraction have, in fact, been processed. If the answer is no, the process returns to step 620 and another zone is selected. Otherwise, the process terminates.

Figure 6B:
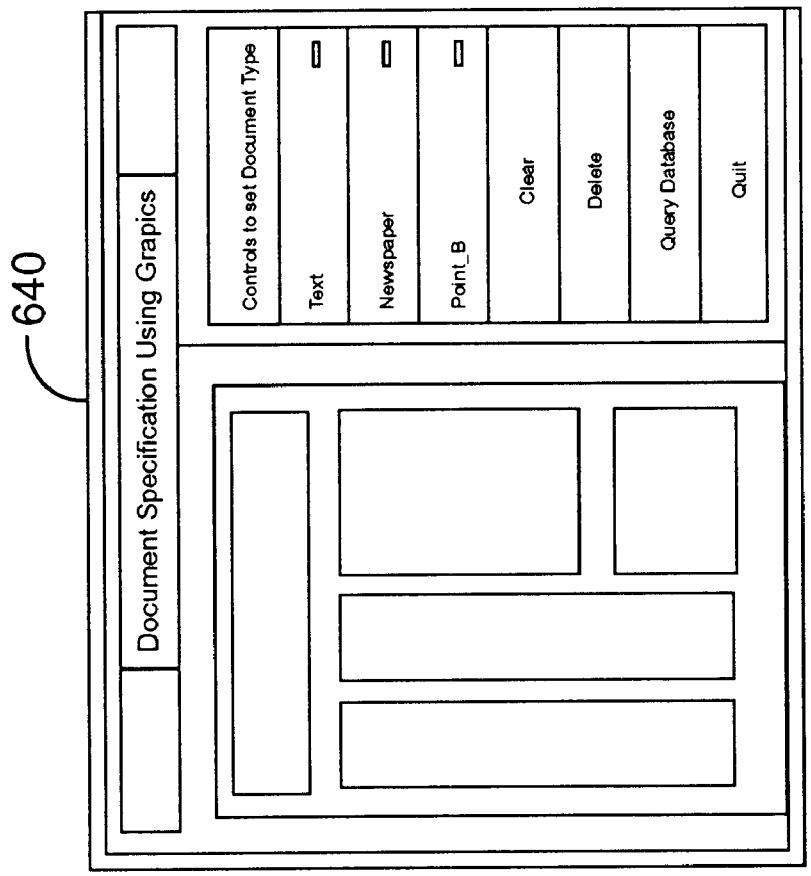
FIGS. 6B and 6C show two images extracted from the document shown in FIG. 3.
Figure 6C:
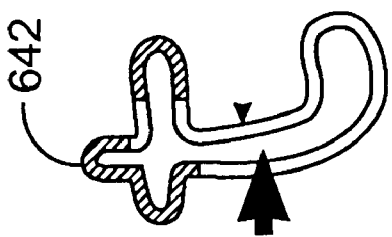

FIGS. 6B and 6C shows images 640 and 642, respectively, extracted from document 310 shown in FIG. 3. In this specific implementation, images 640 and 642 do not include the text captions associated with these images.

The invention allows for query and search based on a combination of text annotation and image features. In an embodiment, text-based query and search for text zones in documents are provided via the use of text annotations associated with the text zones. In another embodiment, text-based query and search for image zones in documents are provided via the use of text annotations associated with the image zones. In yet another embodiment, text-based and image-based query and search for image zones are provided via the use of text annotations and image features associated with the image zones. In yet another embodiment, text-based query and search for text and image zones are provided via the use of text annotations. As can be seen from the above, various combinations of queries and searches are provided by the invention.

The combination of the text-based query and image-based query provides a powerful query mechanism. This combination allows the keywords and image features to be combined to find other documents that contain similar images or similarly annotated images. Thus, the text annotations for images can be used in the document searching process to retrieve other documents that include similar words in their text annotations. The other documents may or may not include similar images.

Figure 7:
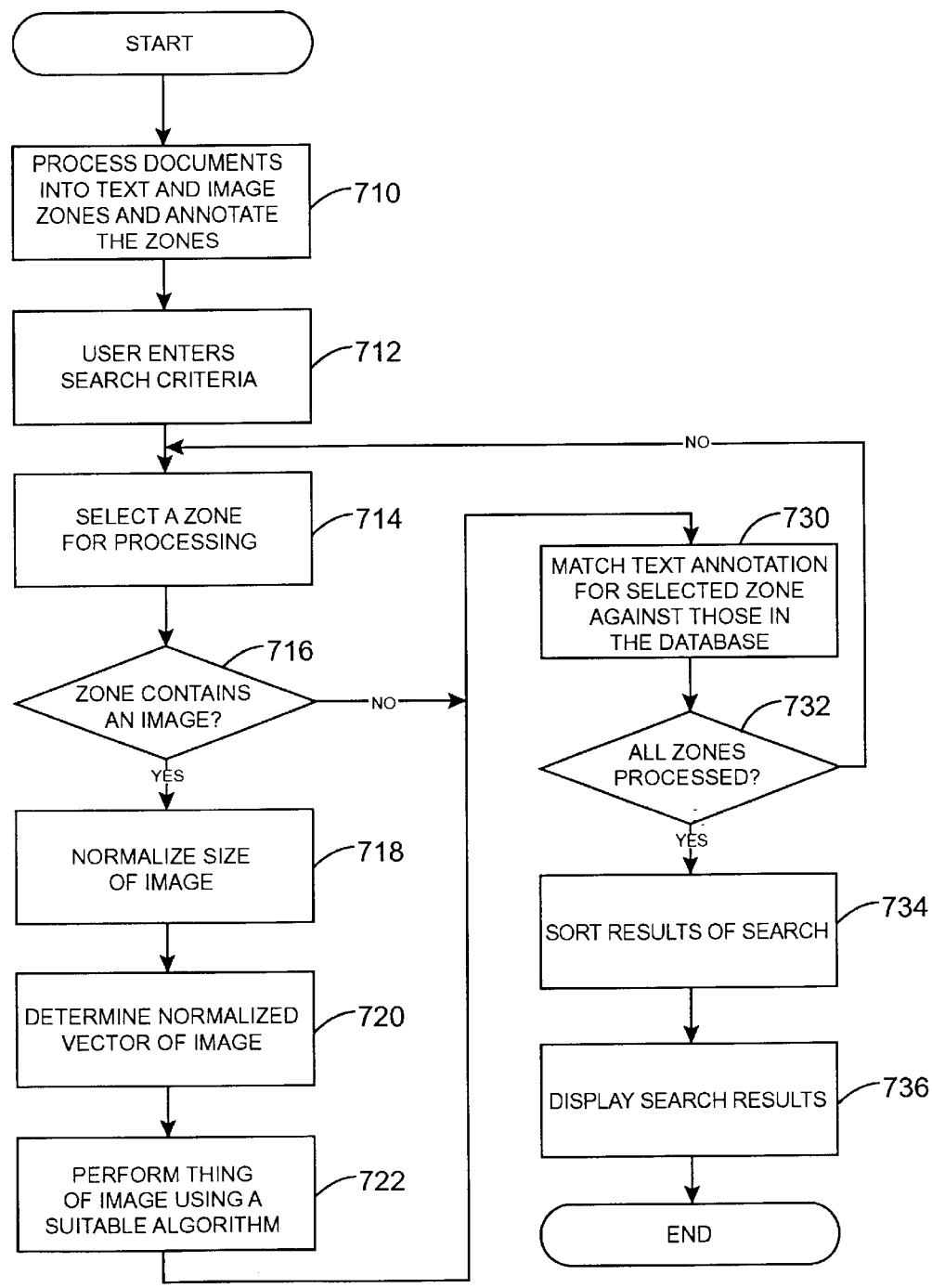
FIG. 7 shows a flow diagram of an embodiment of a document searching process.

FIG. 7 shows a flow diagram of an embodiment of a document searching process. Initially, the documents in the database are decomposed into zones, the zones are segmented into text and image zones, and the zones are annotated with text and image features, at step 710. This processing is typically performed as documents are entered and stored in the database. At step 712, the user initiates a document search and enters the search criteria. This can be performed by defining the search criteria, by modifying parameters of a sample document, or by other mechanisms. The search criteria form a query document.

At step 714, a zone in the query document is selected for processing. A determination is made, at step 714, whether the selected zone comprises an image. If the selected zone does not include an image, the process proceeds to step 730. Otherwise, if the selected zone includes an image, the image is normalized, at step 718, and a normalized vector of the image is determined, at step 720. The normalized vector is used to perform matching of the image using a suitable algorithm, at step 722. One such algorithm is a "nearest neighbor" algorithm known in the art. This algorithm is described in further detail by R. O. Duda and P. E. Hart in a publication entitled "Pattern Classification and Scene Analysis," Addison Wesley, 1973, pages 75–76, and incorporated herein by reference. The result of the vector matching is temporarily stored. Steps 718, 720, and 722 are not performed if the user does not desire matching documents using image features.

At step 730, the text annotation of the selected zone is matched against text annotations of zones in documents in the database. This matching can be performed using the well-known method of "cosine distance measure" which is described by R. R. Korfhage in a publication entitled "Information Storage and Retrieval," Wiley, New York, 1997, pages 84–85, and incorporated herein by reference. The results of the text annotation matching are also temporarily stored. After the matching of this zone is completed, a determination is made whether all zones in the query document have been processed, at step 732. If the answer is no, the process returns to step 714 and another zone is selected for processing. Otherwise, if all zones in the query document have been processed, the results of the matching process are processed and sorted, at step 736. The processing includes the combination of the results from the image feature matching (if any was performed) with the results from the text annotation matching. The image distance between images in the query document and the retrieved documents can be used to compare and rank the candidates from the matching process. A set of documents having the best search results is displayed, at step 736.

Figure 8A:
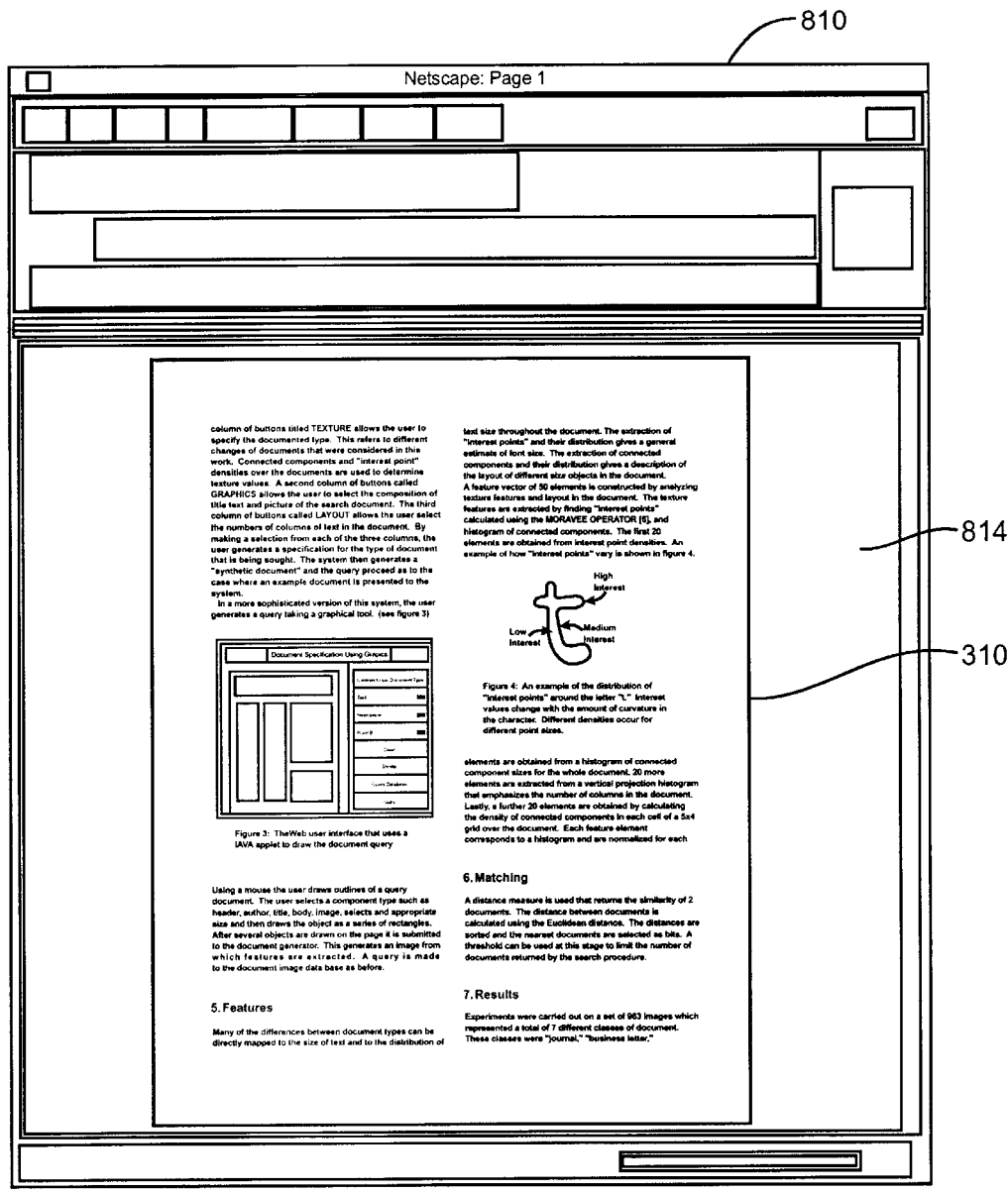
FIG. 8A shows a diagram of an embodiment of the user interface of the document management system.

FIG. 8A shows a diagram of an embodiment of the user interface of the document management system. In an embodiment, the user interface is implemented within a web browser, such as Netscape Corporation's Navigator™ or the Microsoft Corporation's Internet Explorer™. The user interface can also be implemented using other software applications. A display 810 includes a display area 814 that shows document 310.

Figure 8B:
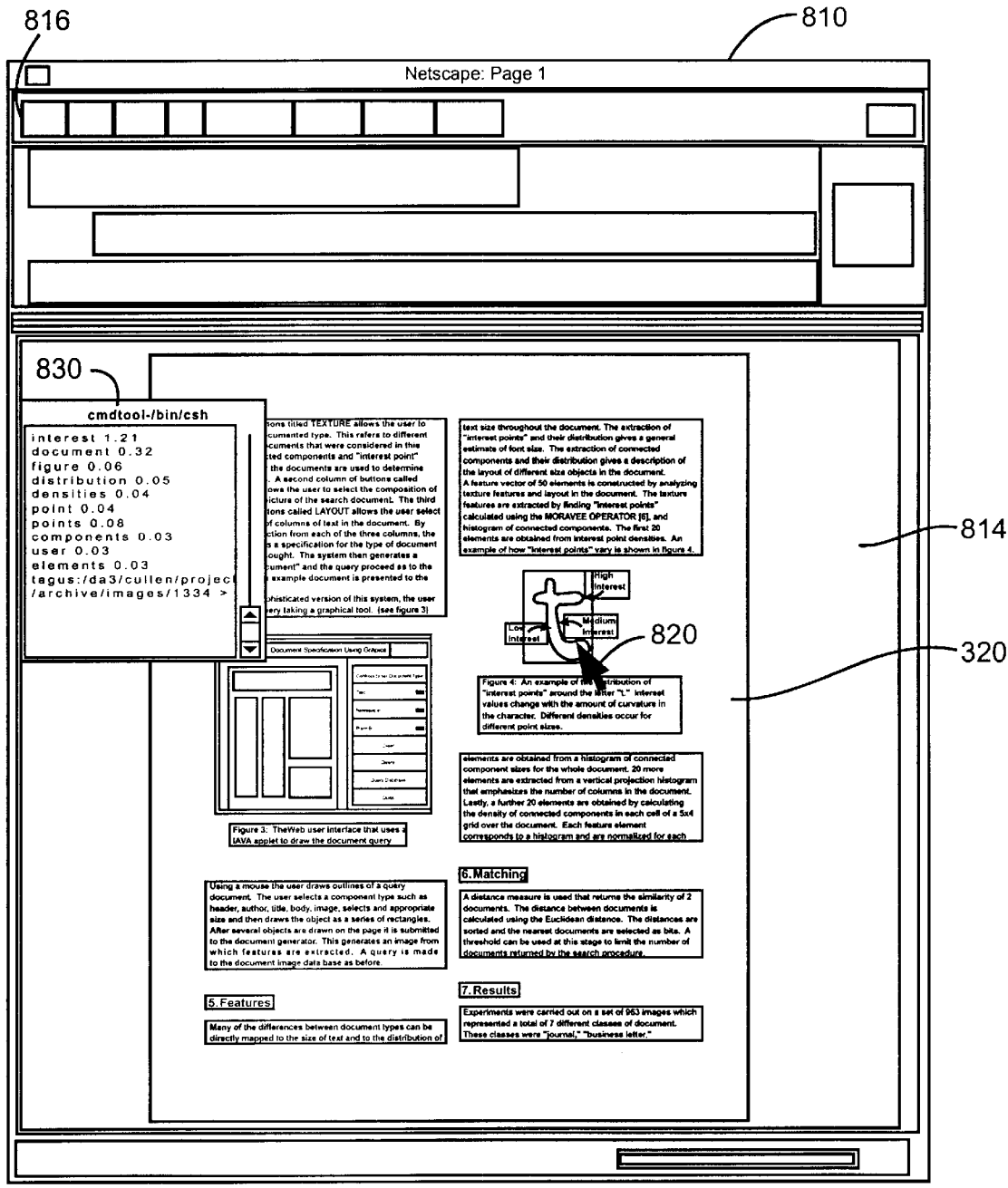
FIG. 8B shows a diagram of an embodiment of the user interface showing a segmented document.

FIG. 8B shows a diagram of an embodiment of the user interface showing a segmented document 320. Document 320 in display area 814 is segmented into zones. This can be performed by the system (i.e., upon a request by the user to decompose document 310 or upon an initiation of a new search). Although not evident from FIG. 8B, segmentation of the documents can be represented by the use of color codes associated with the zones. A cursor 820 can be provided to navigate through document 320, to select the various zones in document 320, and to select the various processes available from menu areas 816. The zones of document 320 are selectable by clicking on the zone.

As shown in FIG. 8B, one or more windows can be created to show the text associated with the zones of the document. By moving a mouse (or other pointing devices) into a region of a (picture or text) zone, the text annotation for that zone can be displayed in a window 830. This feature allows for efficient generation and use of keywords, and relieves the user from having to enter these keywords. The keywords in window 830 can be edited. The keywords can be used to retrieve documents from a database, including databases that are web based.

The text annotation includes words associated with that zone and generated in the manner described above. The user can initiate a search by moving the mouse into a zone and clicking on the mouse. A dialog menu can then be displayed (e.g., using JaveScript) to show the different search options, although this is not shown in FIG. 8B. Similarly, in the case of small 8 dot-per-inch icons, summarized text can be shown for all regions of the document.

Figure 8C:
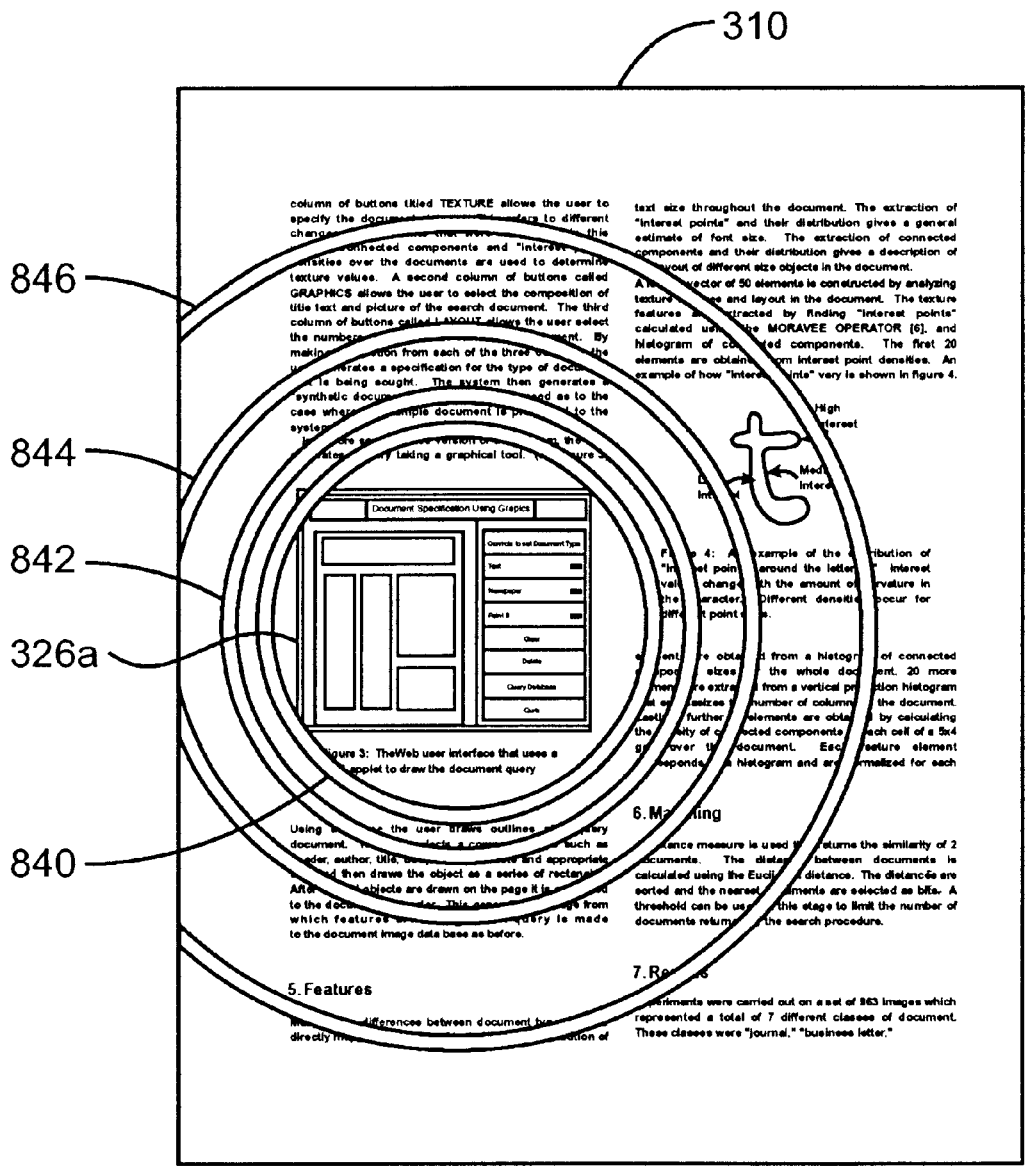
FIG. 8C shows a diagram of a document and the use of a "rain-drop" effect to create an enhanced searching process.

FIG. 8C shows a diagram of document 310 and the use of a "rain-drop" effect to create an enhanced searching process. The user selects a zone for searching and the text annotation for that zone is displayed. In FIG. 8C, image zone 326a is selected. The user then clicks to expand the query from the click point. For every click of the mouse in one direction, the radius of the search for keywords is expanded. For example, the first, second, third, and fourth click selects the search for keywords within the regions enclosed by a circle 840, 842, 844, and 846, respectively. This feature allows the user to modify the distance weighting scheme for a particular search string. The mouse clicking, in effect, provides a variable threshold of equation (1).

The invention provides several advantages. First, the invention provides the ability to find documents containing a particular image (picture) or block of text.

Second, the invention provides the ability to craft more specific queries in which picture image features are combined with text words. Keywords can be combined to generate text annotations (or labels) for pictures by selecting the words neighboring the picture. The text labels and image features of the picture can be used to perform a document query. The same technique can also be applied to text zones.

Third, the pictures in the documents can be used to compose additional documents. Documents in a database can be selected, decomposed, and segmented. The pictures can be entered into a pallet. The pictures in the pallet can be used to electronically generate new documents using, for example, operations of drag, drop, and electronic "staple." Electronic staple refers to the process of "virtually" tagging pages from documents in an archive and generating a new document from the tagged pages. These electronic operations allow for easy modification of old documents and generation of new documents. As an example, an old slide presentation can be spruced up by replacing old date zones and border slogans with slides having additional content.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. For example, other image features matching algorithms than that disclosed above can be used. Thus, the present invention is not intended to be limited to the embodiments shown herein but is to be accorded the widest scope consistent with the principles and novel features disclosed herein.

What is claimed is:

1. A method for operating a document retrieval system comprising:

capturing an unindexed document into electronic form;

decomposing the unindexed document into a plurality of zones, wherein each zone includes text or image or a combination thereof;

forming descriptors comprising text annotations for at least one of the plurality of zones, wherein the text annotations for a particular zone include keywords from inside and outside the particular zone;

searching documents in a document database based on formed descriptors for the unindexed document and descriptors for documents in the database; and identifying at least one document in the database as matching the unindexed document.

2. The method of claim 1 further comprising:

segmenting the plurality of zones into text zones and image zones.

3. The method of claim 1 further comprising:

displaying the identified at least one document.

4. The method of claim 1 wherein the identified at least one document includes images located in close proximity to document descriptors matching the formed descriptors.

5. The method of claim 1 wherein the searching includes:

matching selected ones of image zones in the unindexed document with image zones in documents in the database using text annotations.

6. A method for operating a document retrieval system comprising:

capturing an unindexed document into electronic form;

decomposing the unindexed document into a plurality of zones, wherein each zone includes text or image or a combination thereof;

segmenting the plurality of zones into text zones and image zones;

forming descriptors for at least one of the plurality of zones, wherein the descriptors for image zones comprise image features;

searching documents in a document database based on formed descriptors for the unindexed document and descriptors for documents in the database; and identifying at least one document in the database as matching the unindexed document.

7. The method of claim 6 wherein the image features include normalized vectors.

8. The method of claim 6 wherein the searching includes:

matching selected ones of image zones in the unindexed document with image zones in documents in the database using the image features.

9. The method of claim 8 wherein the matching includes:

executing a nearest-neighbor algorithm.

10. The method of claim 1 wherein the keywords have been filtered to remove stop words and extraneous characters.

11. The method of claim 1 wherein the text annotations for a particular zone includes keywords and associated weights.

12. A method for operating a document retrieval system comprising:

capturing an unindexed document into electronic form;

decomposing the unindexed document into a plurality of zones, wherein each zone includes text or image or a combination thereof;

segmenting the plurality of zones into text zones and image zones;

forming descriptors for at least one of the plurality of zones wherein the descriptors comprise text annotations for a particular zone that include keywords and associated weights, the associated weights being computed based on distances of the keywords to the particular zone;

searching documents in a document database based on formed descriptors for the unindexed document and descriptors for documents in the database; and identifying at least one document in the database as matching the unindexed document.

13. The method of claim 12 wherein the associated weights are further computed based on frequency of occurrence of the keywords.

14. The method of claim 12 wherein the associated weights are further computed based on an area of the particular zone.

15. The method of claim 1 wherein the capturing includes: scanning in the unindexed document using a facsimile machine.

16. The method of claim 1 wherein the capturing includes: scanning in the unindexed document using a scanner.

17. A method for operating a document retrieval system comprising:
capturing an unindexed document into electronic form;
decomposing the unindexed document into a plurality of zones, wherein each zone includes text or image or a combination thereof;
segmenting the plurality of zones into text zones and image zones;
forming descriptors for at least one of the plurality of zones, wherein the descriptors include text annotations of keywords from inside and outside the particular zone and associated weights;
searching documents in a document database based on formed descriptors for the unindexed document and descriptors for documents in the database; and
identifying at least one document in the database as matching the unindexed document.

18. A method for generating search keys for querying a document database comprising:
forming a search key document;
defining a plurality of zones for the search key document, wherein each of the plurality of zones is associated with text or image or a combination thereof;
segmenting the plurality of zones into text zones and image zones, wherein the descriptors for image zones comprise image features; and
forming descriptors for at least one of the plurality of zones of the search key document, wherein each of the descriptors is associated with a particular zone and includes search key information, and wherein the descriptors are used as search keys for querying the document database.

19. The method of claim 18 wherein the descriptors include text annotations for zones that include image.

20. A document management system comprising:
an electronic storage system configured to store
a database of documents, and
descriptors for documents in the database; and
a control system coupled to the electronic storage system, the control system configured to
generate descriptors for at least one zone of an unindexed document,
segment the plurality of zones into text zones and image zones, wherein the descriptors comprise text annotations for a particular zone that includes keywords and associated weights, the associated weights being computed based on distances of the keywords to the particular zone,
search documents in the database using the generated descriptors for the unindexed document image and descriptors for documents in the database,
identify at least one document as matching the unindexed document, and display the identified at least one document.

21. The system of claim 20 further comprising:
an image capture device that transforms documents into electronics form.

22. The system of claim 21 wherein the image capture device comprises a copier.

23. The system of claim 21 wherein the image capture device comprises a facsimile machine.

24. The system of claim 21 wherein the image capture device comprises a scanner.

25. A document querying system comprising:
an image capture device configured to capture document images;
an electronic storage system configured to store
a database of document images, and
an index of descriptors of the document images; and
a querying system coupled to the image capture device and the electronic storage system, the querying system configured to form descriptors of a query document, wherein the descriptors are associated with zones of the query document, wherein the descriptors comprise text annotations for a particular zone that include keywords from inside and outside the particular zone.

26. A computer-implemented method of operating an archival system for documents, wherein each document is separable into a plurality of zones, each zone being a document subset selected from the group consisting of text and graphical images, said method comprising:
capturing an image of an unindexed document into the document archival system;
separating the image of the unindexed document into the plurality of zones;
forming descriptors comprising text annotations for at least one of the plurality of zones of the unindexed document, wherein the text annotations for a particular zone include keywords from inside and outside the particular zone;
searching an index of descriptors for documents in a document database, wherein the searching is performed using the formed descriptors of the unindexed document; and
identifying at least one document from the document database as matching the unindexed document, wherein the identified at least one document has more descriptors in common with the formed descriptors of the unindexed document than an unrelated document.

27. A computer-implemented method of browsing a document database comprising:
generating a search key document;
decomposing the search key document into a plurality of zones;
segmenting the plurality of zones into text zones and image zones, wherein the descriptors for image zones comprise image features;
forming descriptors for at least one of the plurality of zones of the search key document;
searching descriptors of documents in the document database using the formed descriptors for the search key document;
identifying at least one document in the document database as a matching document when the identified at least one document has more descriptors in common with the search key document than a non-matching document; and
displaying the matching document.

\* \* \* \* \*